(12) United States Patent
Vanluijt et al.

(10) Patent No.: US 7,010,267 B2
(45) Date of Patent: Mar. 7, 2006

(54) ARRANGEMENT WITH BEACON FOR PROVIDING INFORMATION SERVICE

(75) Inventors: Balthasar Antonius Gerardus Vanluijt, Eindhoven (NL); Paul John Rankin, Horley (GB); Christopher Brian Marshall, Haywards Heath (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 498 days.

(21) Appl. No.: 10/099,369

(22) Filed: Mar. 14, 2002

(65) Prior Publication Data

US 2002/0132614 A1 Sep. 19, 2002

(30) Foreign Application Priority Data

Mar. 19, 2001 (GB) .................................... 0106681

(51) Int. Cl.
*H04L 12/00* (2006.01)
(52) U.S. Cl. .................. 455/41.2; 455/404.2; 455/408; 455/456.3; 705/15; 705/64
(58) Field of Classification Search ................ 709/218; H04L 12/00
See application file for complete search history.

(56) References Cited

U.S. PATENT DOCUMENTS 6,219,696 B1 * 4/2001 Wynblatt et al. ........... 709/218
6,847,823 B1 * 1/2005 Lehikoinen et al. ...... 455/456.1

FOREIGN PATENT DOCUMENTS

| FI | 991978 A | 3/2001 |
|---|---|---|
| WO | WO9907125 | 2/1999 |
| WO | WO0120844 | 3/2001 |
| WO | WO 200120844 A1 * | 3/2001 |

* cited by examiner

*Primary Examiner*—Fan Tsang
*Assistant Examiner*—Lisa Hashem
(74) *Attorney, Agent, or Firm*—Larry Liberchuk

(57) ABSTRACT

A beacon (120) adapted for use in an arrangement (100) for providing an information service, comprising a storage (225) for storing data related to the information service, local communication means (220, 221, 222) for establishing a short range communication link (125) with a mobile device (130), and a processor (224) adapted for autonomously performing the service based on the data in the storage (225) with the mobile device (130) using the short range communication link (125). The arrangement (100) preferably further comprises a server (101) arranged to receive data to be used in the information service from a terminal (230) and to forward the received data to the beacon (120) over the long range communication link (127).

14 Claims, 3 Drawing Sheets

ARRANGEMENT WITH BEACON FOR PROVIDING INFORMATION SERVICE

Figure 1:
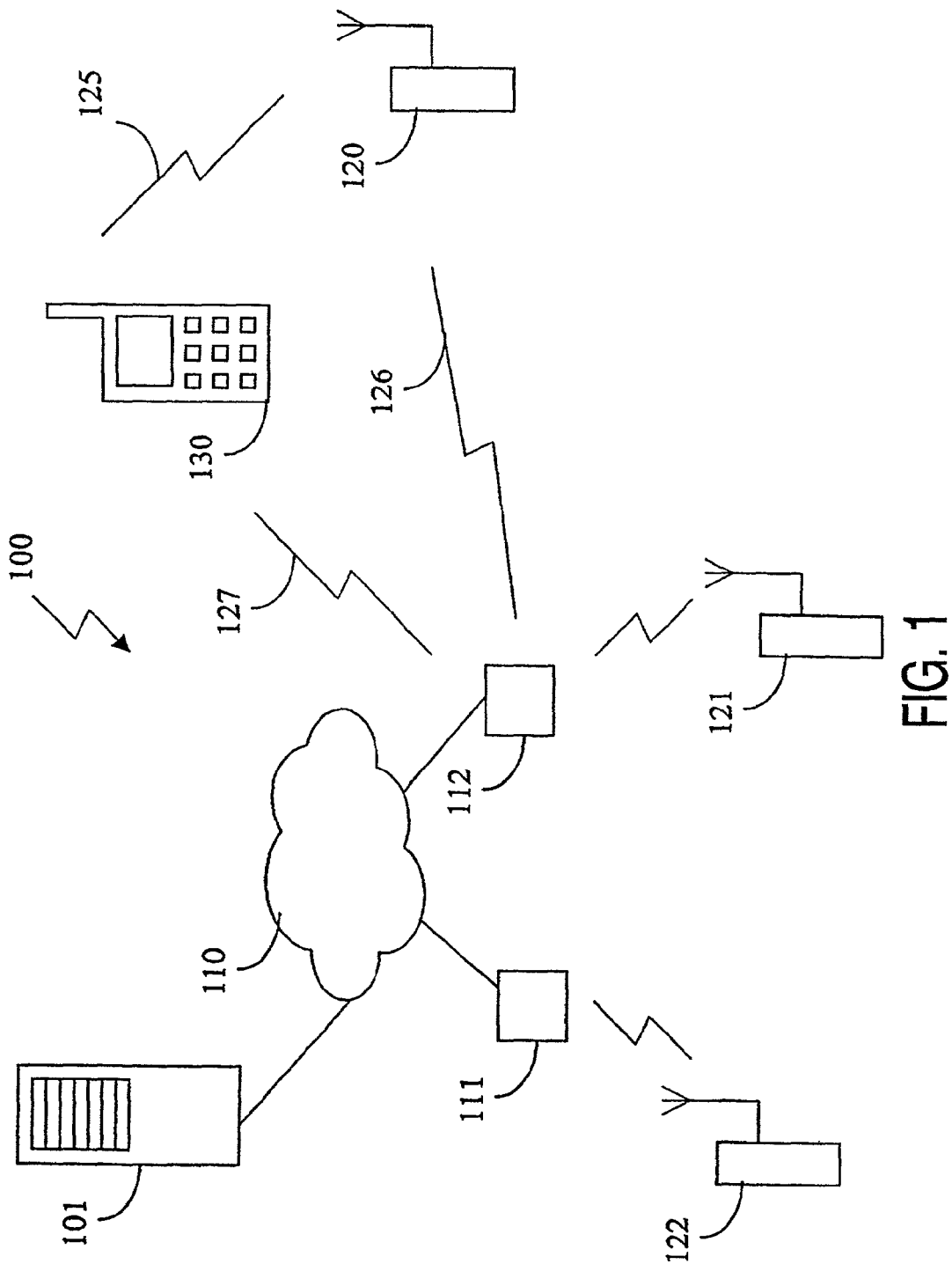

The invention relates to an arrangement for providing an information service to a user of a mobile device, in which a beacon is used to communicate with the mobile device.

Recent years have seen a great increase in subscribers world-wide to mobile telephone networks and, through advances in technology and the addition of functionalities, cellular telephones have become personal, trusted devices. A result of this is that a mobile information society is developing, with personalized and localized services becoming increasingly more important. Such "Context-Aware" (CA) mobile telephones communicate with low power, short range beacons in places like shopping malls to provide location-specific information. This information might include local maps, information on nearby shops and restaurants and so on. The user's CA terminal may be equipped to filter the information received according to pre-stored user preferences and the user is only alerted if an item of data of particular interest has been received.

A suitable communication technology for this type of service is Bluetooth™, which is a short range communication system, based on a global radio-frequency (RF) standard, which operates on the 2.4 GHz ISM band, providing license-free operation in the United States, most of Europe and Japan. Using Bluetooth, the user's terminal can quickly obtain information transmitted via the beacon. For more information on Bluetooth, see the Internet URL http://www.bluetooth.com/.

There are many application scenarios where the typical information request will be highly dependent on the location and likely to be identical or similar for many requesters at that location. For example, a restaurant may want to announce its daily menu to every passer-by. This has led to the proposal to add a broadcast mode to Bluetooth, so that a beacon at a certain location could communicate with potentially many mobile devices in its reach. The broadcast mode would solve some of the restrictions in the current definition of Bluetooth 1.1, and would enable fast connections, many parallel users, low power use in the mobile device, and would preserve the anonymity of the mobile device in the first phases of the connection. This opens up many interesting new business opportunities.

While the type of applications that become possible in this way is undisputedly attractive, it is not obvious how the evolution from today's networks towards beacon-enhanced solutions can take place. The overall system design of the network as currently envisaged is really a dual network structure. Parallel to the wireless network (e.g. the GSM network) there is a deployment of beacons, which are typically interconnected via a fixed IP network to the backend services.

Not only is there for this second, fixed network a classical chicken-and-egg problem, but also the mobile industry in which this should land is currently not very well conditioned to start large scale investment programs with unproven revenue models. The more advanced operators are highly leveraged because of investments in third-generation spectrum, as well as the necessary infrastructure cost of full national coverage for current and future networks.

The dual network approach is at first glance a very logical one. The beacons are to be installed in a fixed location, so a permanent, fixed line IP network connection gives a low-cost, high bandwidth pipe to the mobile devices that are within the reach of the beacon. Some exploratory thoughts have been devoted to identifying infrastructures that are already in place, like the use of networks that link cash registers, or credit card terminals. This would give access to most points-of-payment, which may serve as a launching application for the new services.

The complications in this are largely in the area of organizational complexity. Since there is not a single business entity that provides all the necessary interconnections to all of the access points, many contracts with different entities will need to be closed to provide even marginal coverage of the new service. Each of the contracts needs negotiation on initial investments, installation, revenue sharing, Quality of Service, maintenance and liability.

It is an object of the invention to reduce the organizational complexity present in the deployment of an arrangement for providing an information service.

This object is achieved according to the invention in a beacon comprising a storage for storing data related to the information service, local communication means for establishing a short range communication link with a mobile device, and a processor adapted for autonomously performing the service based on the data in the storage with the mobile device using the short range communication link.

A lot of the deployment complexity disappears if the whole operation is in the hands of a single entity. By placing part of the functionality of the backend service provider in the beacon, the beacon is able to interact autonomously with the users. No fixed connection with a backend service is necessary to offer services, since the autonomous beacon can offer them itself. Deployment of the beacons then becomes as simple as sending a beacon to a shop or other point of interest and plugging it into a power outlet. The acceptance and rapid rollout of such an approach could be much better than really having to install a networked device in any other scenario.

Traffic between beacon and the handhelds in its serving range is highly repetitive, and repetitive traffic can be handled by local intelligence and storage in the beacon itself. The ability to make beacons plug&play by just adding power is great for non-permanent situations, like e.g. a pop festival, or a weekly market.

It is a key innovation and an advantage that the terminal's cellular network and the beacon's cellular network are the same, or at least run by the same operator. In this case the owner of the mobile device only has one relationship—with the cellular operator—and all traffic concerned with his communication flows over the infrastructure provided by this operator. Hence increasing functionality and usefulness results in more traffic and revenue for the operator providing the mobile device and the beacon.

In an embodiment the beacon further comprises long range communication means for establishing a wireless long range communication link to a server, the processor being arranged for exchanging data with the server over the long range communication link. Mobile networks are becoming packet-switched, always-on, using technologies such as GPRS or UMTS. A wireless long range communication link with the server can thus be established over such a mobile network, making it possible to exchange data with the server without needing to connect the beacon to a fixed line IP network of some kind.

The only time traffic goes from a beacon to the backend service during actual operation, is when an information update is required or when a user-specific transaction needs to be performed. In the case of a congested network, the transaction can potentially be logged in the beacon, and transferred outside the peak hours. Even if the information in the beacon is updated in a busy period by a single cellular message, then this information can be passed on to large numbers of mobile devices without further use of the busy cellular channel.

In a further embodiment the processor is arranged to record statistical data regarding the information service and to periodically report the recorded information to the server. Statistical data, such as data related to particular transactions performed with the mobile device, or statistics on the varying traffic-density in the area in which the beacon is installed, can be very useful to determine the success of the service. Also, user profiles for users of the service can be derived more easily, which is commercially attractive.

Usage statistics and diagnostics can be handled over the long range communication link, which is preferably a GPRS or UMTS cellular network. Information to be used for billing purposes can also be passed from the beacon over the cellular network back to the infrastructure.

Preferably the statistical data at least identifies frequently requested data related to the information service, and the processor is further arranged to pre-fetch the frequently requested data from the server. For data traffic, the autonomous beacons could be seen as caches at the very edge of the network, so that pre-fetching data and storing frequently requested, popular (even non-localized) content could off-load the spectrum needs for the cellular operator.

In a further embodiment the storage is arranged to be loaded with data received from the server over the long range communication link. This has the advantage that entities who want to offer the information service need to contact the operator of the server in order to install data such as photos or menus on the beacon. The operator can charge a fee for this. This embodiment thus makes it technically possible to implement a new business model.

The pre-loading of data in the storage of the beacon can be over the GPRS network, in off-peak hours, or as a low-priority background network task. This takes care of the installation and initialization problem.

In a further embodiment the remote communication means are arranged to establish the long range communication link automatically after the short range communication link has been established. This has the advantage that an initially short range-only transaction, e.g. offering the browsing of a menu, causes a long range transmission to be initiated. This generates revenue for the mobile phone network operator over which the long range transmission is initiated.

In a further embodiment the processor is arranged to retransmit information received over the long range communication link to the mobile device over the short range communication link. It may happen that plural mobile devices need to be provided with the same information, for example at an airport or train station all passengers want to know departure times and gates, especially in the case of delays. Ordinarily, this requires a separate communication link between a transmitter and each of said mobile devices. However, with the beacon according to the invention it is possible to broadcast the information to each device.

The information is transmitted once to the beacon and then once, in broadcast or multicast fashion to the plural mobile devices. The transmission to the mobile devices can even be done on an individual basis. Since this transmission is a short range transmission, no capacity in any cellular network is necessary to inform users. Only one (possibly periodic) transmission over the cellular network to the beacon is necessary to update the provided information.

It is a further object of the invention to provide an arrangement for providing an information service, which can be deployed with lesser complexity than prior art arrangements.

This object is achieved according to the invention in an arrangement comprising a beacon according to the invention, and a server arranged to receive data to be used in the information service from a terminal and to forward the received data to the beacon over the long range communication link. This has the advantage that entities who want to offer the information service need to contact the operator of the server in order to install data such as photos or menus on the beacon. The operator can charge a fee for this. This arrangement thus makes it technically possible to implement a new business model.

In an embodiment personal data regarding a user of the information service is stored at the server and the server is arranged to supply at least a portion of the personal data regarding the user to a proprietor of the location where the information service is provided in response to receiving an identifier for the user from the beacon over the long range communication link.

Figure 2:
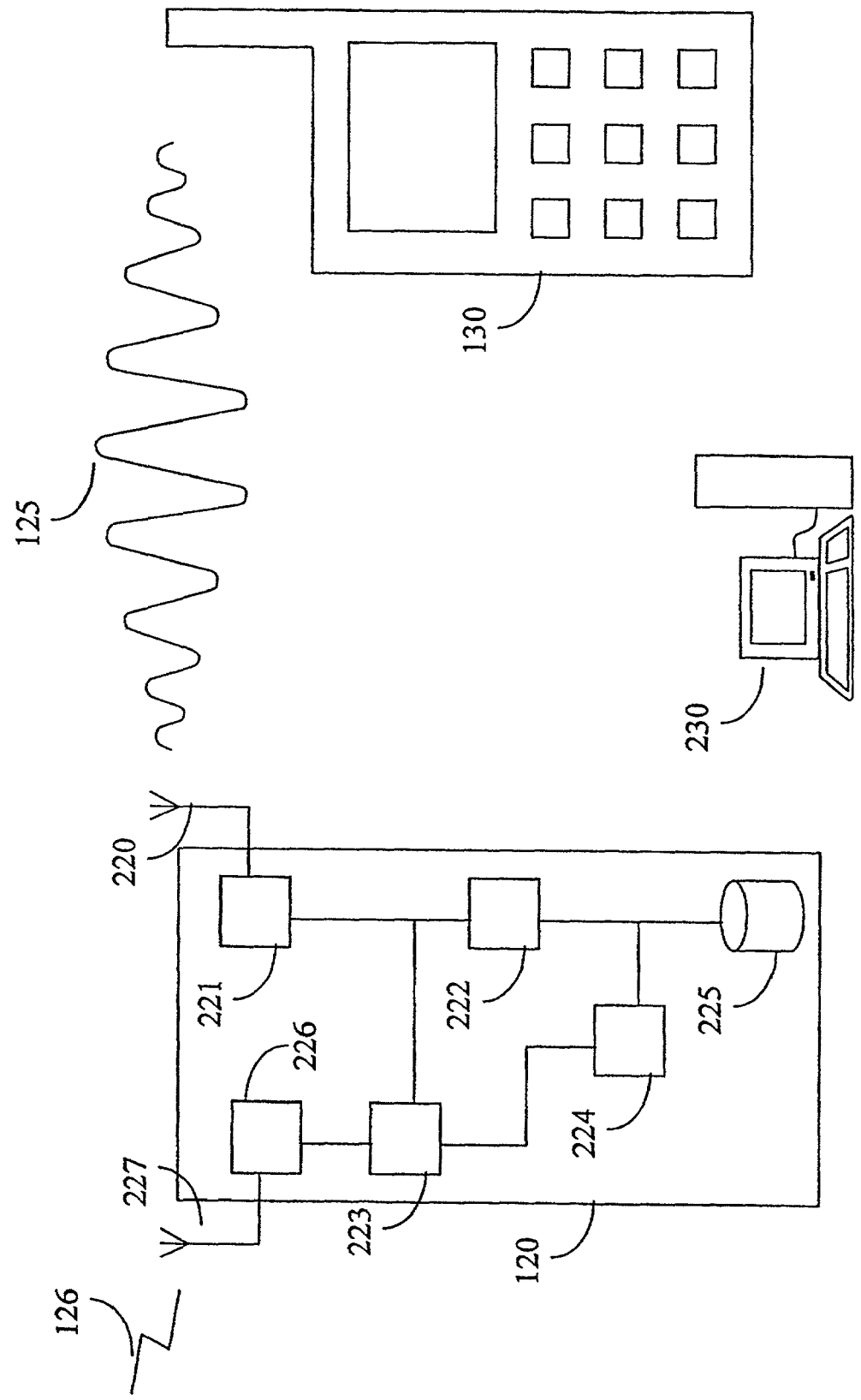

These and other aspects of the invention will be apparent from and elucidated with reference to the embodiments shown in the drawings, in which:

FIG. 1 schematically shows a first embodiment of an arrangement comprising a beacon and a mobile device according to the invention;

FIG. 2 schematically shows the beacon in more detail; and

Figure 3:
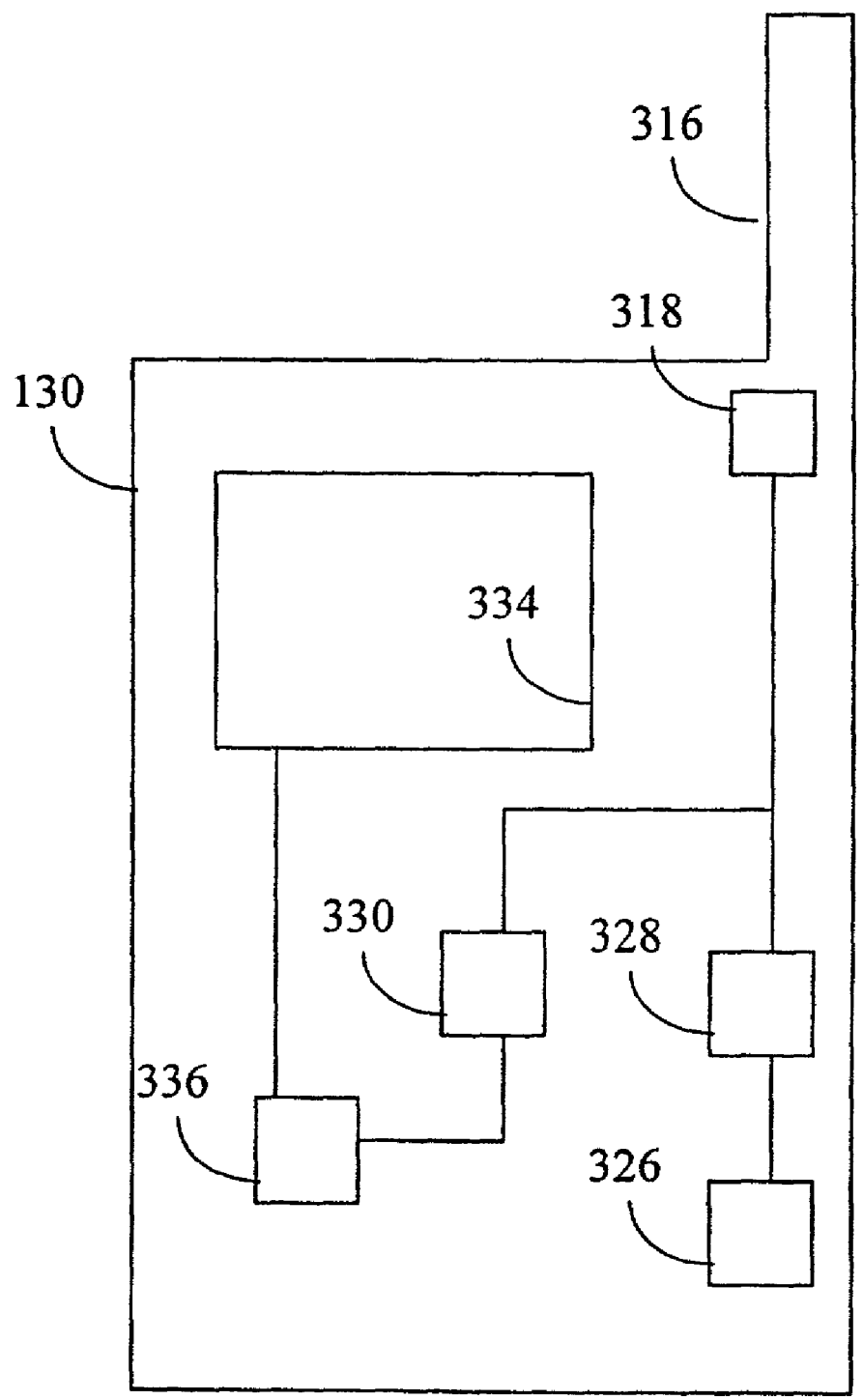

FIG. 3 schematically shows the mobile device in more detail.

Throughout the figures, same reference numerals indicate similar or corresponding features. Some of the features indicated in the drawings are typically implemented in software, and as such represent software entities, such as software modules or objects.

FIG. 1 schematically shows an arrangement 100 comprising a plurality of beacons 120, 121, 122 distributed over a series of locales. Each of the beacons 120, 121, 122 broadcasts in a wireless fashion one or more short range signals, using a short range wireless communication protocol. In a preferred embodiment the technology for the wireless broadcasts is Bluetooth, on the grounds that it is expected to become a component part of a large number of mobile devices. In other embodiments, the technology could be IEEE 802.11 or 802.11b Wireless LAN. The mobile device 130, which in a preferred embodiment is a mobile phone, has the capability to receive the short range wireless communication from the beacons 120, 121, 122 and so receives the broadcasted signal 125 and processes it, for example by displaying a message on a display screen, or retrieving an information unit whose identifier was provided in the broadcasted signal 125.

The beacons 120, 121, 122 further comprise a wireless transmission module with which they can wirelessly exchange data with a server 101. The server 101 can for example be connected to a network 110, such as the Internet, a phone network or a cable network. Also connected to the network 110 are base stations 111, 112. The beacon 120 transmits a wireless transmission 126 to the base station 112, which in turn transmits to the server 101 via the network 110. Similarly, the server 101 transmits to the base station 112 which in turn transmits wirelessly to the beacon 120. Suitable technologies for the wireless transmissions are for example the General Packet Radio Service (GPRS) or the Universal Mobile Telecommunications System (UMTS). Of course, a heterogeneous solution, in which one base station uses one technology, and another base station uses another technology, is also feasible.

The beacon 120 can make use of an existing mobile communication infrastructure, such as a GRPS or UMTS network for its wireless transmission 126, and it is not necessary to connect the beacon 120 to any landline network, or even to have a permanent network connection to the beacon 120 in place. This greatly simplifies the complexity of the arrangement 100. Using the wireless transmission 126, the beacon 120 can contact the server 101 when necessary. Further, the mobile communication infrastructure incorporating the base stations 111, 112 typically already is in place and used for mobile telephony. The arrangement 100 can then simply be deployed by installing the beacons 120, 121, 122 in points of interest, without having to also set up a separate network connecting the beacons 120, 121, 122 to the network 110 or to the server 101.

The mobile device 130 is arranged for wireless mobile communication. For example, the user of the mobile device 130 can place a mobile phone call this way. The mobile device 130 then connects to the base station 112, and the communication link 127 is then established and handled as usual. The mobile device 130 here uses the same mobile communication infrastructure as the beacon 120, but this is of course not necessary.

The arrangement 100 provides an implementation of an infrastructure for use in points of interest such as, for example, department stores, shopping malls, theme parks, airports, stadiums, etc. Since the beacons 120, 121, 122 communicate in a wireless fashion, installation in the point of interest can be as simple as plugging in a power cord and turning on the beacon. The arrangement 100 may be used to provide location-specific information such as local maps, information on nearby shops and restaurants and so on, with the beacon 120, 121, 122 downloading information to the mobile device 130, preferably in the form of information keys.

An information key is a small data object that provides a reference to a source of full information, and it is in the form of a number of predetermined fields, one of which may contain a short piece of descriptive text presented to a user. Another field may be a pointer or address of some form, for example a URL or telephone number. Other supplementary fields may control how the data is presented to a user and how the address may be exploited. The beacon will generally broadcast cyclically a number of these keys, each typically relating to a different service.

The beacon 120, 121, 122 can provide information and services to anyone within its range. Since the range is limited, depending on the technology used, it is possible to offer localized information and services. For instance, a Bluetooth-enabled beacon can transmit with a range of up to ten meters, which is sufficient for e.g. a store that wants to reach passers-by outside.

FIG. 2 schematically shows the beacon 120 in more detail. The beacon 120 comprises an aerial 220 coupled to a short range transceiver 221 for the transmission and reception of data. A short range communication module 222 broadcasts information and communicates with devices in the vicinity via the short range transceiver 221 and the aerial 220 using a short range wireless communication technology such as Bluetooth, IEEE 802.11 or 802.11b Wireless LAN. A wireless transmission module 223 communicates with the base station 111, 112 and the beacon 120 via a second aerial 227 coupled to a cellular transceiver 226 using a communication technology such as GPRS or UMTS. In due course, with multimode designs, it is to be expected that one could have a combined transceiver that was switched to operate either as a cellular radio as a short range radio, depending on the desired functionality at the time.

The beacon 120 is further equipped with a local processor 224 and local storage 225 such as a hard disk or solid state memory. Using the local processor 224 and the local storage 225, the beacon 120 can interact autonomously with any device that can pick up the broadcasted transmission 125 and this way autonomously provide an information service.

As an illustrative embodiment, consider the situation in which the beacon 120 is installed in a restaurant, whose owner wants to use it to entice passers-by to enter the restaurant. The local storage 225 in the beacon is loaded once with the logo of the restaurant, photographs of the interior, some music that suggests the style of experience a visitor would enjoy, the standard menu card, once every day with "today's specials", and once every few minutes information on the seating availability or how long the wait would be is updated. From that moment on, the beacon 120 is able to have an autonomous interaction with people that pass the restaurant.

The short range communication module 222 broadcasts data retrieved from local storage 225 via the short range transceiver 221. The mobile device 130 picks up the broadcasted transmission 125 and presents the picture, music, menu and available seating to the user. This information may be provided in stages, with initial information broadcast, and further details such as pictures, menu, or seat availability, provided to the user on request. Then, if the user is interested and wants to make a reservation, he can have the mobile device make the call to the restaurant. The number to call has of course been included in the broadcasted transmission 125.

At the end of the day, the beacon 120 reports statistics on any communication exchanges 125 that it has undertaken, particularly any requests for further information to which the beacon has responded. The operator of the arrangement 100 can charge a fee to the restaurant, according to the advertising information provided.

As a further illustrative embodiment, consider the situation in which the beacon 120 is installed in an airport, where the airline wishes to use it to keep its travelers up to date about flight changes and boarding arrangements. The local storage 225 in the beacon is updated every now and again using the cellular transceiver 226 as events such as gate changes or boarding opening occur. Meanwhile the beacon 120 is able to have an autonomous interaction with passengers and staff in the airport, repeatedly broadcasting the status of the flight departures and arrivals. The short range communication module 222 broadcasts data retrieved from local storage 225 via the short range transceiver 221 as broadcasted transmission 125. The mobile device 130 picks up the broadcasted transmission 125 and presents the flight status to the user. With further software on the mobile device 130 the user can be alerted if there are any important changes.

The local storage 225 in the beacon 120 is preferably loaded by a transmission from the server 101 via the base station 112 to the beacon 120. This has the advantage that entities such as the restaurant owner in the illustrative embodiment above need to contact the operator of the server 101 in order to install data such as photos or menus on the beacon 120. The operator can charge a fee for this. To this end, a terminal 230 can be equipped for communication with the server 101. Alternatively, the terminal 230 can be equipped with a wireless uploading module, for example a GPRS transmitter, that allows direct uploading of data to the beacon 120. The cellular transceiver 226 receives the transmitted data from either the server 101 wirelessly via the base station 112, or the terminal 230 and passes it on to the wireless transmission module 223, which decodes the data and stores it in the local storage 225.

The terminal 230 enables a service provider, i.e., the user of beacon 120, to author or edit allocated service slots in the form of added data piggy backed on inquiry facilitation signals transmitted by the beacon 120. A service provider may lease a beacon or one of the service slots in a beacon from the infrastructure provider. To this end, in a preferred embodiment the server 01 provides simple HTML templates or WAP cards for filling out by the user via the terminals 230.

Having filled out the template with, for example, a description of the service and other information for the data to be carried via the beacon broadcast, the template is returned to server 101, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 101 then creates the appropriate additional data package for appending to the inquiry signal of the beacon 120 based on the information submitted with the template. The arrangement 100 may further comprise an application server to assist in carrying out various functions, as will be readily understood by the skilled reader.

The additional data package is then transmitted to the base station 112 via the network 110, since the beacon 120 is within range of the base station 112. The base station 112 then transmits the additional data package wirelessly to the beacon 120. Using the aerial 227 and the cellular transceiver 226, the wireless transmission module 223 receives the data package and updates the data in the local storage 225. Updating data stored in the local storage 225 preferably takes place during off-peak hours to minimize the load and/or transmission costs for the wireless communication channel between the base station 112 and the beacon 120.

The local processor 224 autonomously performs interactive services with the mobile device 130. In the illustrative embodiment the short range communication module 222 broadcasts a global overview of the menu offered in the restaurant. The user of the mobile device 130 can indicate his preference for an item in the overview, e.g. pizzas or pastas. The short range communication module 222 receives this indication and passes it on to the local processor 224. The processor 224 then selects an overview of dishes matching the indicated preference, which overview is then transmitted to the mobile device 130. This way, the user can interactively browse the menu.

More complex services can also be handled by a central server such as the server 101. The mobile device 130 then establishes a wireless connection to the server 101. Using this connection, the user of the mobile device 130 can e.g. make a reservation in the restaurant, which requires that his personal data is provided to the restaurant owner. This personal data can be stored at the server 101 and can be supplied upon his request. This way, an initially short range-only transaction, e.g. offering the browsing of a menu, causes a long range transmission to be initiated. This generates revenue for the mobile phone network operator over which the long range transmission is initiated. This operator may then provide a commission to the entity which operates the beacon 120.

The local processor 224 may further collect data related to transactions performed with mobile devices, which the wireless transmission module 223 periodically transmits to the server 101 or another party. This way the entity which installed the beacon 120 can be charged in accordance with the actual use of the beacon 120. Further, this data can be correlated with data related to calls initiated by the mobile device 130, in order to find out which of these calls were the result of a short range communication between the mobile device 130 and the beacon 120.

The short range communication link 125 between the mobile device 130 and the beacon 120 can also be used while the long range communication link 127 between the mobile device 130 and the server 101 is being established, to hide to the user of the mobile device 130 the delay involved in setting up the long range communication link 127. The user can browse the information made available by the beacon 120 using the short range communication link 125, and then seamlessly move to more complex interactive applications with the server 101 once the long range communication link 127 has been established. This may require that the beacon 120 transfers information regarding the state of the short range communication link 125 to the server 101.

It may happen that plural mobile devices need to be provided with the same information, for example at an airport or train station all passengers want to know departure times and gates, especially in the case of delays. Ordinarily, this requires a separate communication link between a transmitter and each of said mobile devices. However, with the beacon 120 it is possible to broadcast the information to each device. The information is transmitted once to the beacon 120 and then once, in broadcast or multicast fashion to the plural mobile devices. The transmission to the mobile devices can even be done on an individual basis. Since this transmission is a short range transmission, no capacity in any cellular network is necessary to inform users. Only one periodic transmission over the cellular network to the beacon 120 is necessary to update the provided information.

The beacon 120 can also report to the server 101 on the varying traffic-density and types of Bluetooth devices that interacted with the beacon 120, as this measure of local activity might be a commercially useful statistic about the locale. The beacon 120 also has the possibility of reporting back in a batch data mode the precise Bluetooth device identifiers BT_ADDRs discovered at different times of the day. Note that any mobile device response to Bluetooth v1.1 inquiry scans also discloses the broad category (phone etc) and functional abilities of the mobile device, which could be useful statistics as well.

Device IDs can be correlated with the owner of the mobile device, so the geographical habits of individually named users and certainly the repeated visits of an unidentified user to a place can be easily noted for personal targeting. Like other user-profiling data, this knowledge is commercially valuable. For example, habit profiles vs. device IDs might be assembled centrally and fed back to a beacon overnight for individual customized addressing of those users if they appear at that beacon the next day.

FIG. 3 schematically shows the mobile device 130 in more detail. The mobile device 130 comprises an aerial 316 coupled with a transceiver 318 for the reception and transmission of messages. Outgoing messages result from user input to the telephone, either audio input via a microphone and an A/D converter or other data input via a keypad or other input means. These inputs are processed to message data format by signal and data processing stage 326 and converted to transmission format by encoder 328 before being supplied to the transceiver 318. The mobile device 130 may comprise separate aerials and transceiver modules for the reception of data broadcasted by the beacon 120 and for the transmission and reception of data over a wireless communication link in a mobile telephony network.

Messages received via the aerial 316 and transceiver 318 are passed to a decoding, filtering and signal processing stage 330. If the data carried by the message is for presentation on a display screen 334 of the telephone, the data will be passed to a display driver 336, optionally after buffering, with the driver formatting the display image. As will be recognized, the display 334 may be a relatively simple low-resolution device, and the conversion of received data to display data may be carried out as a subset of the processing stage functionality, without the requirement for a dedicated display driver stage. For conventional audio messages, the audio data is output after filtering and processing via a D/A converter and an amplifier to an earphone or speaker.

Where the message is carrying data from one or other of the beacons 120, 121, 122 the mobile device 130 preferably has the ability to filter the information received according to pre-stored user preferences and the user is only alerted (i.e. the information will only be retained in the buffer and/or presented on the screen 334) if comparison of stored preference data and subject matter indicators in the message indicate that an item of data of particular interest has been received.

The user can browse through the received data using the keypad or other input means, and make a selection or indicate a preference in the data. This selection or indication is then transmitted back to the beacon 120, which may in response transmit more detailed data regarding the selection or indication. The mobile device 130 may have to establish a separate connection with the beacon 120, to distinguish the more detailed data from the data that is already being transmitted via broadcast. Protocols such as Bluetooth allow the quick establishment of such connections.

Communication between the mobile device 130 and the beacon 120 can take two forms: "push" and "pull". In "push" mode, information is broadcast by the beacon 120 in the form of short messages comprising information keys. The keys will take various forms according to the application but will generally include a concise description of the information being sent and a pointer to fuller information, e.g. a URL identifying a service provider.

Keys are received by the mobile device 130 "unconsciously", that is, without direct intervention by the user, and automatically filtered according to the user's pre-set preferences by a comparator function applied in processing stage 330. Suitably, the processing stage 330 is operable to apply the comparator function in multiple simultaneous or overlapping copies such as to process in parallel the relatively large number of keys that may be received. Some will be discarded, some kept for further study, others might cause the user to be alerted immediately. By way of example, shops might choose to push details of special offers into passing terminals in the knowledge that users who have interest and have therefore set their filters accordingly will be alerted by their terminal.

Sometimes the user will wish to obtain more information than is contained in the keys. Here, "pull" mode allows a user to set up a connection with the beacon 120 and actively request information to pull down into the mobile device 130. This mode is therefore typically interactive.

Whilst the beacons 120, 121, 122 will typically be independent of one another (in a shopping mall set up, each shop provides and maintains its own beacon without reference to any beacons provided by neighboring shops), the beacons 120, 121, 122 may be arranged to exchange information with each other. The beacons can be interconnected using the wireless link, so again no extra infrastructure is necessary. Having autonomous, wirelessly interconnected beacons also has a large number of advantages.

The arrangement 100 now is easier to scale from a spectrum perspective. For the broadcast mode, scaling is virtually unlimited. Also, the number of simultaneous interactions with users is limited for one beacon so adding more beacons to a locale increases the capacity without the need for additional spectrum.

The arrangement 100 is now also easier to scale from a server capacity perspective. There no longer is a need to update all individual potentially interested users, instead just the relevant set of beacons need to be updated. In the extreme case, e.g. showing slow motion repeats of a goal in a soccer stadium, the server 101 multicasts the data to a single network of perhaps 300 beacons in the stadium, instead of serving individual streams to 30.000 mobile devices over the cellular network.

The arrangement 100 is also robust to network failure or congestion. The broadcast and local interactions will continue to work, and even transactions could be logged in the beacon and transmitted back to the server 101 after the problem has been fixed.

The beacon 120 could in principle act as a relay station for cellular transmissions as well, if the user stays within reach, or if there is a smooth handover between interconnected beacons. Now the mobile device can do low-power transmissions, and the beacon acts as a relay station.

From a business perspective, the value of traffic and the user willingness to pay for it varies greatly, depending on the phase of the interaction. In the restaurant embodiment, the restaurant owner is probably willing to pay a monthly fee for the broadcast part (logo, address data, music +photos, standard menu, special of the day). This is then a category of "low value" data for which the operator does not want to use capacity in his cellular network. The restaurant owner probably would be willing to pay some per-customer fee, if the customer interactively checks the menu and/or availability of seats. The end user will probably want to pay to make a reservation. So for this, the mobile operator probably wouldn't mind a regular cellular connection that loads his network. So the conclusion of this is that the flexibility in directing traffic can be coupled to the business needs of the operator.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A system for providing an information service, comprising:
    a beacon for communicating with a mobile device and with a wireless long range communication link;
    local communication means for establishing a short range communication link with said mobile device, long range communication means for establishing said wireless long range communication link with a server, a local storage for storing data related to the information service, the storage being arranged to be loaded by a transmission from the server over the long range communication link, and a processor adapted for autonomously performing the service based on the data in the storage with the mobile device using the short range communication link and for exchanging data regarding the service with the server over the long range communication link, said mobile device interacting wirelessly with a network operator and said beacon interacting wirelessly with said network operator, wherein said short range communications link and said mobile device is used when said long range communications link between the mobile device and the server is being established so that a delay in setting up the long range communications link is concealed from a user.

2. The system of claim 1, in which the processor is arranged to record statistical data regarding the information service and to periodically report the recorded information to the server.

3. The system of claim 1, in which the statistical data at least identifies frequently requested data related to the information service, and the processor is further arranged to pre-fetch the frequently requested data from the server.

4. The system of claim 1, in which the remote communication means are arranged to establish the long range communication link automatically after the short range communication link has been established.

5. The system of claim 1 in which the processor is arranged to retransmit information received over the long range communication link to the mobile device over the short range communication link.

6. The system of claim 1, in which the processor is arranged to periodically broadcast data related to the information service.

7. The system according to claim 1 further comprising an arrangement for providing an information service, comprising said beacon, and said server being arranged to receive data to be used in the information service from a terminal and to forward the received data to said beacon over the long range communication link.

8. The system according to claim 1 further comprising the arrangement of claim 7, in which personal data regarding a user of the information service is stored at the server and the server is arranged to supply at least a portion of the personal data regarding the user to a proprietor of a location where the information service is provided in response to receiving an identifier for the user from the beacon over the long range communication link.

9. The system according to claim 1 further comprising the arrangement of claim 7, in which the beacon is arranged to record statistical data regarding the information service and to periodically report the recorded information to the server.

10. The system according to claim 1 further comprising the arrangement of claim 8, in which the statistical data comprises an identifier for the mobile device, and the server is arranged to maintain a user habit profile for a user of the mobile device at least based on the identifier, which profile is fed to the beacon for individual customized addressing of the user.

11. The system according to claim 1 further comprising the arrangement of claim 7, in which a direct long range communication link between the server and the mobile device is established after the short range communication link has been established, and the providing of the service is taken over from the beacon by the server after the direct long range communication link has been established.

12. The system of claim 1, in which the long range communication means are arranged to transfer information regarding the state of the short range communication link to the server.

13. The system according to claim 1 wherein said mobile device and said beacon are in a same cellular network.

14. The system according to claim 1 wherein said short range communication link and said mobile device being used initiates said long range communications link between said mobile device and said server being established.

* * * * *